United States Patent
Avudaiyappan et al.

(10) Patent No.: US 9,348,754 B2
(45) Date of Patent: May 24, 2016

(54) SYSTEMS AND METHODS FOR IMPLEMENTING WEAK STREAM SOFTWARE DATA AND INSTRUCTION PREFETCHING USING A HARDWARE DATA PREFETCHER

(71) Applicant: Soft Machines, Inc., Santa Clara, CA (US)

(72) Inventors: Karthikeyan Avudaiyappan, Sunnyvale, CA (US); Mohammad Abdallah, San Jose, CA (US)

(73) Assignee: SOFT MACHINES INC., Santa Clara, CA (US)

( * ) Notice: Subject to any disclaimer, the term of this patent is extended or adjusted under 35 U.S.C. 154(b) by 511 days.

(21) Appl. No.: 13/649,469

(22) Filed: Oct. 11, 2012

(65) Prior Publication Data

US 2014/0108739 A1   Apr. 17, 2014

(51) Int. Cl.
| G06F 12/00 | (2006.01) |
| G06F 12/08 | (2016.01) |
| G06F 12/02 | (2006.01) |
| G06F 9/00 | (2006.01) |
| G06F 9/30 | (2006.01) |
| G06F 9/345 | (2006.01) |
| G06F 9/38 | (2006.01) |

(52) U.S. Cl.
CPC .............. *G06F 12/0862* (2013.01); *G06F 9/00* (2013.01); *G06F 9/30047* (2013.01); *G06F 9/3455* (2013.01); *G06F 9/383* (2013.01); *G06F 12/0215* (2013.01)

(58) Field of Classification Search
CPC .......................... G06F 12/0215; G06F 12/0862

USPC .................................. 711/137, 154, 204, 213
See application file for complete search history.

(56) References Cited

U.S. PATENT DOCUMENTS

| 6,311,260 | B1 * | 10/2001 | Stone ...................... G06F 9/383 711/137 |
| 6,453,389 | B1 * | 9/2002 | Weinberger et al. .......... 711/137 |
| 6,535,962 | B1 * | 3/2003 | Mayfield ............. G06F 12/0862 711/122 |
| 6,564,313 | B1 | 5/2003 | Kashyap |
| 6,636,945 | B2 | 10/2003 | Nakamura |
| 6,915,415 | B2 | 7/2005 | Mayfield et al. |
| 7,509,484 | B1 | 3/2009 | Golla et al. |
| 7,533,242 | B1 * | 5/2009 | Moll ................... G06F 12/0862 711/213 |
| 7,707,359 | B2 | 4/2010 | Mesard et al. |
| 8,549,255 | B2 | 10/2013 | Schroter et al. |
| 9,098,418 | B2 | 8/2015 | Kannan et al. |
| 2006/0265572 | A1 | 11/2006 | Stempel et al. |
| 2007/0150660 | A1 | 6/2007 | Marathe et al. |
| 2007/0294482 | A1 * | 12/2007 | Kadambi et al. .............. 711/137 |
| 2009/0199190 | A1 * | 8/2009 | Chen ....................... G06F 9/383 718/102 |
| 2010/0169611 | A1 | 7/2010 | Chou et al. |
| 2011/0040906 | A1 | 2/2011 | Chung et al. |
| 2011/0145502 | A1 * | 6/2011 | Joshi et al. .................... 711/125 |
| 2013/0262779 | A1 | 10/2013 | Bobba et al. |
| 2014/0089589 | A1 | 3/2014 | Meier et al. |
| 2014/0208039 | A1 | 7/2014 | Gilbert |

* cited by examiner

*Primary Examiner* — Prasith Thammavong

(57) ABSTRACT

A method for weak stream software data and instruction prefetching using a hardware data prefetcher is disclosed. A method includes, determining if software includes software prefetch instructions, using a hardware data prefetcher, and, accessing the software prefetch instructions if the software includes software prefetch instructions. Using the hardware data prefetcher, weak stream software data and instruction prefetching operations are executed based on the software prefetch instructions, free of training operations.

19 Claims, 5 Drawing Sheets

SYSTEMS AND METHODS FOR IMPLEMENTING WEAK STREAM SOFTWARE DATA AND INSTRUCTION PREFETCHING USING A HARDWARE DATA PREFETCHER

In computer architecture, data prefetching is the speculative accessing of data from a source memory location and the placement of the data into a closer destination cache location based on past data accesses or future instructions. Prefetching occurs when a processor requests data from memory (e.g., main memory) and places the data into a cache location before it is actually needed by the processor. When the data is actually needed, the data can be accessed much more quickly from the cache than from memory.

Modern microprocessors operate much faster than associated memories where program data is kept. Because of this, program data may not be able to be read fast enough to keep a microprocessor busy. Data prefetching is used to help ameliorate this performance gap. Data prefetching hides data access latency by decoupling and overlapping data transfers and computation. Moreover, data prefetching reduces stalling due to cache misses by bringing data closer to the computing processor before it is requested.

Types of prefetching include but are not limited to stride prefetching and stream prefetching. In stride prefetching, the distance between a series of addresses from which data is to be fetched is determined prior to the prefetch operations. This distance is called a stride. In stream prefetching, data access operations of software is examined for a period in order identify a data access pattern from which a continuous series or "stream" of prefetch operations may be based. In both cases a data access pattern is identified upon which speculative prefetches of data from memory may be based.

Accordingly, in the case of stream prefetching, latency is introduced by the need to conduct training operations before actual stream prefetching can be performed. In addition, conventional prefetchers are limited by the access patterns anticipated as a part of their design, and thus do not have the capacity to identify the access patterns that are not anticipated when they are designed. Consequently, the performance of conventional prefetchers is degraded because of the latency attributable to their training period and their inability to learn unanticipated data access patterns.

SUMMARY

The performance of conventional prefetchers is degraded because of the latency attributable to their training period and their inability to learn unanticipated data access patterns. A method for implementing weak stream software data and instruction prefetching using a hardware data prefetcher is disclosed that addresses these shortcomings. However, the claimed embodiments are not limited to implementations that address any or all of the aforementioned shortcomings. A method includes, determining if software includes software prefetch instructions using a hardware data prefetcher, and, accessing the software prefetch instructions if they are detected. Using the hardware data prefetcher, weak stream software data and instruction prefetching operations are executed based on the software prefetch instructions, free of training operations. The aforementioned methodology does not require a training period and uses the prefetching functionality of a hardware prefetcher to use instructions that are provided as a part of the software by the programmer of the software that specifies the actual data access patterns from which prefetching operations are based.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
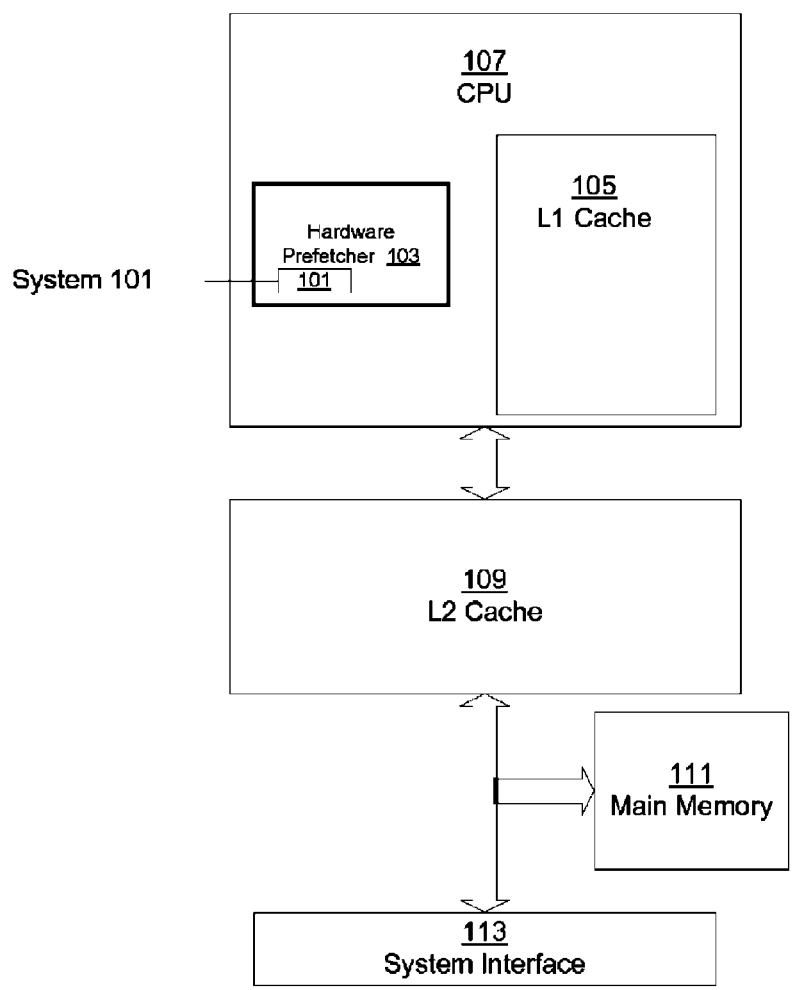
FIG. 1A shows an exemplary operating environment of a system for implementing weak stream software data and instruction prefetching using a hardware data prefetcher according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "prefetching" or "accessing" or "identifying" or "providing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices. As used herein the term "weak stream prefetcher" is intended to refer to a prefetcher that has the capacity to simultaneously perform prefetching for a certain number of streams and that can drop the performance of prefetching for a stream (or streams) in order to free up capacity such that prefetching for a new stream is enabled.

Exemplary Operating Environment of a System for Implementing Weak Stream Software Data and Instruction Prefetching Using a Hardware Data Prefetcher According to One Embodiment FIG. 1A shows an exemplary operating environment 100 of a system 101 for implementing weak stream software data and instruction prefetching using a hardware data prefetcher according to one embodiment. System 101, using a hardware data prefetcher, determines if software executing on an associated processor includes prefetch instructions and, if so, acceses therefrom information upon which stream prefetches are based. System 101, as part of a data and instruction prefetcher, causes the performance of weak stream data and instruction prefetching, based on the software prefetch instructions, without the need to perform preceding training operations in order to determine a data access pattern. FIG. 1A shows system 101, prefetcher 103, L1 cache 105, CPU 107, L2 cache 109, main memory 111 and system interface 113.

Figure 1B:
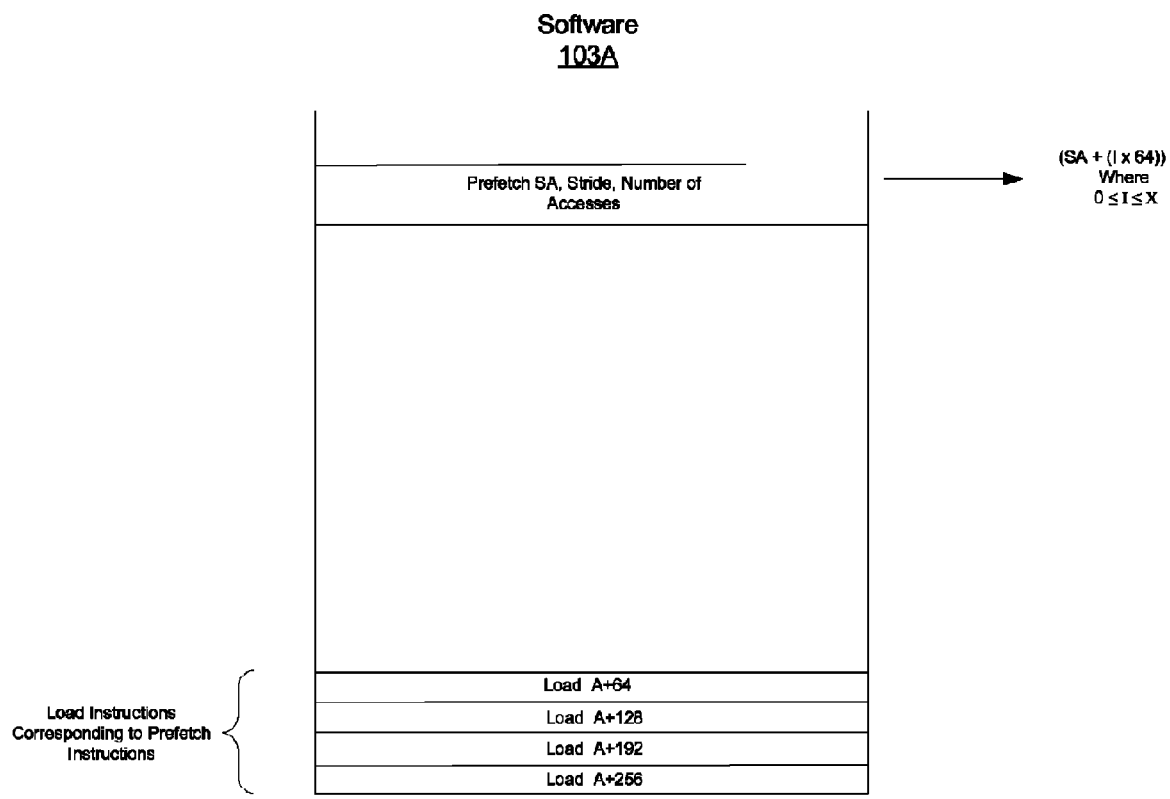
FIG. 1B shows a software program that includes software prefetch instructions according to one embodiment.

Referring to FIG. 1A, CPU 107 includes prefetcher 103 that includes system 101. System 101 determines if software includes software prefetch instructions and uses the software prefetch instructions to perform weak stream data and instruction prefetching to obtain prefetch data and instructions for use in the execution of the software. FIG. 1B shows a software program 103A that includes software prefetch instructions. In one embodiment, the software program includes values for starting address (SA), stride (e.g., 64 in FIG. 1B, but can have other values) and number of accesses (i) that indicate a data access pattern of the software. In one embodiment, when the prefetch instructions are obtained from the software, based on the prefetch instructions, the pattern of data and instruction accesses that is indicated in the instructions is made to main memory 111. In one embodiment, when data and instructions are returned from main memory 111, they are placed in a cache. Accordingly, when the data and instructions are desired, they can be accessed much more quickly than if they needed to be accessed from main memory.

Referring again to FIG. 1A, L1 cache 105 is a level 1 cache and L2 cache 109 is a level 2 cache. In one embodiment, L1 cache 105 maintains entries that are accessed by requests for data and instructions that are associated with addresses located in L1 cache 105. And, L2 cache 109 maintains entries that are accessed by requests for data and instructions that are associated with addresses located in L1 cache 105. In one embodiment, as discussed above, when data and/or instructions that are sought by the prefetcher from main memory 111 are accessed from main memory 111 the data is placed into cache (e.g., L1 or L2 cache).

Main memory 111 includes physical addresses that store the information that is copied into cache memory when it is requested from main memory 111. In one embodiment, system 101, using information taken from a software prefetch instruction, prefetches data as part of weak stream data and instruction prefetching operations, that is located in a series of addresses of main memory 111. In one embodiment, the accessing of the addresses is directed by the data and instruction access pattern that is provided by the software prefetch instruction. Also, shown in FIG. 1A is system interface 113.

Operation

Figure 1C:
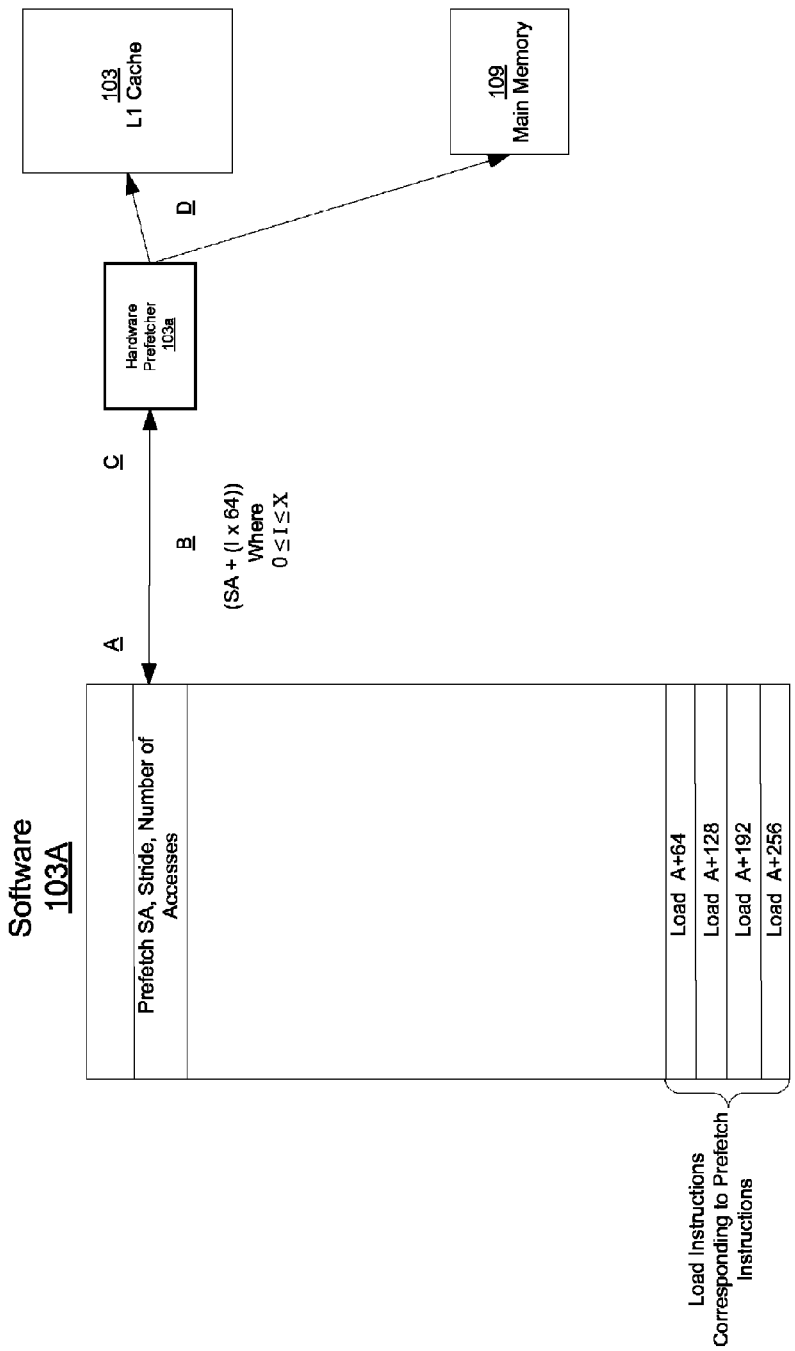
FIG. 1C illustrates operations performed by system for implementing weak stream software data and instruction prefetching using a hardware data prefetcher according to one embodiment according to one embodiment.

FIG. 1C illustrates operations performed by system 101 for implementing weak stream software data and instruction prefetching using a hardware data prefetcher according to one embodiment according to one embodiment. These operations, which relate to weak stream software data and instruction prefetching using a hardware data prefetcher are illustrated for purposes of clarity and brevity. It should be appreciated that other operations not illustrated by FIG. 1C can be performed in accordance with one embodiment.

Referring to FIG. 1C, at A, using a hardware data prefetcher, software 103A is examined for the presence of software prefetch instructions.

At B, if it is determined that the software includes software prefetch instructions, information provided by the software prefetch instructions is identified. In the FIG. 1C example, the prefetch instructions include values for starting address (SA), stride (e.g., 64 in FIG. 1C) and number of accesses (i). In FIG. 1C, the load request instructions corresponding to the software prefetch instructions are shown at the bottom of software 103A.

At C, the software prefetch instructions that are identified are provided to a hardware prefetcher.

At D, using a data prefetcher, weak stream software data and instruction prefetching operations are performed based on said software prefetch instructions that are identified.

Figure 2:
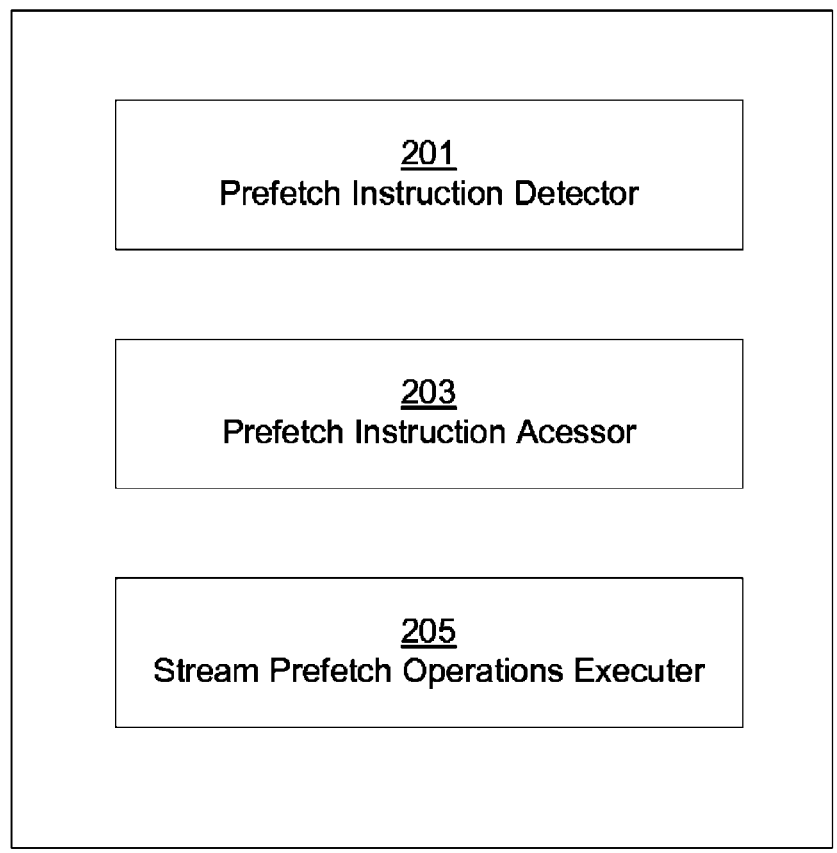
FIG. 2 shows components of a system for implementing weak stream software data and instruction prefetching using a hardware data prefetcher according to one embodiment.

Components of System for Implementing Weak Stream Software Data and Instruction Prefetching Using a Hardware Data Prefetcher According to One Embodiment FIG. 2 shows components of a system 101 for implementing weak stream software data and instruction prefetching using a hardware data prefetcher according to one embodiment. In one embodiment, components of system 101 implement an algorithm for weak software data and instruction prefetching using a hardware data prefetcher. In the FIG. 2 embodiment, components of system 101 include prefetch instruction detector 201, prefetch instruction accessor 203 and stream prefetch operations executer 205.

Prefetch instruction detector 201 determines, as a part of a hardware prefetcher, if software that executes on a processor that prefetch instruction detector 201 is associated with includes software prefetch instructions. In one embodiment, prefetch instruction detector 201 examines the software for instructions that indicate a data access pattern of the software. In one embodiment, the instructions can be placed in the software at a specified location or locations by the programmer of the software. In other embodiments, the instructions can be placed in the software at a location or locations that is not specified.

Prefetch instruction accessor 203 accesses, as a part of a hardware prefetcher, software prefetch instructions in software that is executing on the processor with which the prefetch instructor accessor 203 is associated. In one embodiment, prefetch instructor accessor 203 accesses instructions that characterize a specific data access pattern to be executed and provides this information to the prefetcher associated with the processor. In one embodiment, the instructions can provide values for starting address, stride and number of accesses that indicate a data access pattern of the software.

Stream prefetch operations executer 205, as a part of a hardware prefetcher, executes weak stream software data and instruction prefetching operations based on software prefetch instructions. In one embodiment, stream prefetching operations are based on the information provided to the prefetcher by prefetch instruction accessor 203 (e.g., starting address, stride and number of accesses).

In one embodiment the aforementioned components of system 101 can be implemented in hardware. In one embodiment, components and operations of system 101 can be encompassed by components and operations of one or more computer hardware components and circuitry (e.g., prefetcher 103 in FIG. 1A). In another embodiment, components and operations of system 101 can be separate from the aforementioned one or more computer hardware components and circuitry but can operate cooperatively with components and operations thereof.

Figure 3:
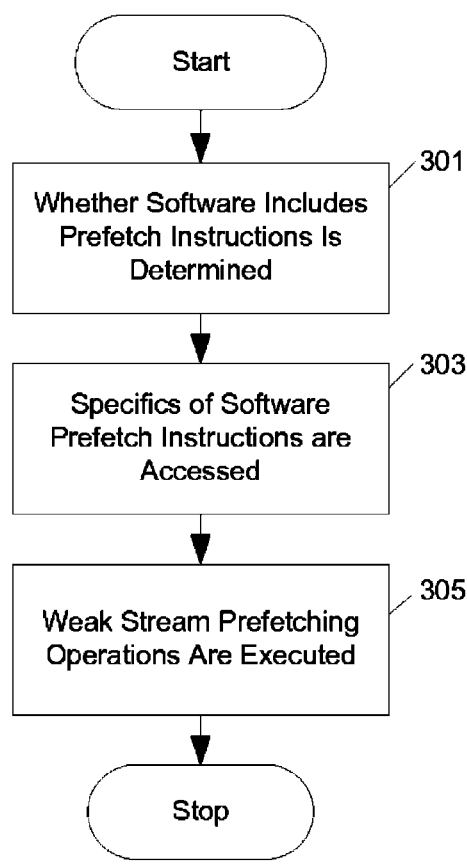
FIG. 3 shows a flowchart of the steps performed in a method for for implementing weak stream software data and instruction prefetching using a hardware data prefetcher according to one embodiment.

Method for Implementing Weak Software Data and Instruction Prefetching Using a Hardware Data Prefetcher According To One Embodiment FIG. 3 shows a flowchart 300 of the steps performed in a method for weak software data and instruction prefetching using a hardware data prefetcher according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

At 301, it is determined, using a hardware data prefetcher (such as by prefetch instruction accessor 201 of FIG. 2), whether software that executes on a processor includes software prefetch instructions.

At 303, the specifics of the software prefetch instructions are accessed, using a hardware data prefetcher (such as by prefetch instruction detector 203 of FIG. 2) such that they can be utilized by a prefetcher associated with the processor.

At 305, using a hardware data prefetcher, weak stream software data and instruction prefetching operations are executed (such as by stream prefetch operations executer 205 of FIG. 2) based on the software prefetch instructions.

With regard to exemplary embodiments thereof, systems and methods a method for weak stream software data and instruction prefetching using a hardware data prefetcher is disclosed. A method includes, determining if software includes software prefetch instructions using a hardware data prefetcher, and, accessing the software prefetch instructions if the software includes software prefetch instructions. Using the hardware data prefetcher, weak stream software data and instruction prefetching operations are executed based on the software prefetch instructions, free of training operations.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for weak stream software data and instruction prefetching using a hardware data prefetcher, comprising:
    using said hardware data prefetcher, determining if said software comprises software prefetch instructions;
    if said software comprises software prefetch instructions, accessing said software prefetch instructions; and
    using said hardware data prefetcher, executing weak stream software data and instruction prefetching operations based on said software prefetch instructions, wherein said weak stream software data and instruction prefetching operations comprise simultaneously prefetching for a plurality of streams and dropping prefetching for at least one stream to free up capacity for a new stream.

2. The method of claim 1 wherein said software prefetch instructions are located at a predetermined place in the software.

3. The method of claim 1 wherein said software prefetch instructions comprise a starting address, a stride and a number of accesses.

4. The method of claim 1 wherein said stream prefetching operations are performed free of a learning period.

5. The method of claim 1 wherein if said software does not comprise prefetch instructions stride based prefetching operations are executed as a part of a learning period.

6. The method of claim 1 wherein said number of accesses is greater than zero and less than 31.

7. A prefetcher, comprising:
    a system for weak stream software data and instruction prefetching using a hardware data prefetcher comprising:
        a determiner for determining if said software comprises software prefetch instructions;
        an accessor for, if said software comprises software prefetch instructions, accessing said software prefetch instructions; and
        an executor for executing weak stream software data and instruction prefetching operations based on said software prefetch instructions, wherein said weak stream software data and instruction prefetching operations comprise simultaneously prefetching for a plurality of streams and dropping prefetching for at least one stream to free up capacity for a new stream.

8. The prefetcher of claim 7 wherein said software prefetch instructions correspond to a data and/or instruction access pattern.

9. The prefetcher of claim 7 wherein said software prefetch instructions are located at a predetermined place in the software.

10. The prefetcher of claim 7 wherein said software prefetch instructions comprise a starting address, a stride and a access number.

11. The prefetcher of claim 7 wherein said weak stream prefetching operations are performed free of a learning period.

12. The prefetcher of claim 7 wherein if said software does not comprise prefetch instructions then stride based prefetching operations are executed as a part of a learning period.

13. The prefetcher of claim 7 wherein said endpoint is greater than zero and less than 31.

14. A processor comprising:
cache components; and
a prefetcher, comprising:
a system for weak stream software data and instruction prefetching using a hardware data prefetcher comprising:
a determiner for determining if said software comprises software prefetch instructions;
an accessor for, if said software comprises software prefetch instructions, accessing said software prefetch instructions; and
an executor for executing weak stream software data and instruction prefetching operations based on said software prefetch, wherein said weak stream software data and instruction prefetching operations comprise simultaneously prefetching for a plurality of streams and dropping prefetching for at least one stream to free up capacity for a new stream.

15. The processor of claim 14 wherein said software prefetch instructions correspond to a data and/or instruction access pattern.

16. The processor of claim 14 wherein said software prefetch instructions are located at a predetermined place in the software.

17. The processor of claim 14 wherein said software prefetch instructions comprise a starting address, a stride and a number of accesses.

18. The processor of claim 14 wherein said weak stream prefetching operations are performed free of a learning period.

19. The processor of claim 14 wherein if said software does not comprise software prefetch instructions, then stride based prefetching operations are executed as a part of a learning period.

* * * * *